(12) United States Patent
Dickinson et al.

(10) Patent No.: US 10,994,672 B2
(45) Date of Patent: May 4, 2021

(54) TETHERED FASTENER APPARATUS AND METHOD

(71) Applicant: Termax Corporation, Lake Zurich, IL (US)

(72) Inventors: Daniel James Dickinson, Lincolnshire, IL (US); Michael Tirrell, Volo, IL (US); John Clasen, Crystal Lake, IL (US)

(73) Assignee: TERMAX LLC, Lake Zurich, IL (US)

( * ) Notice: Subject to any disclaimer, the term of this patent is extended or adjusted under 35 U.S.C. 154(b) by 326 days.

(21) Appl. No.: 14/918,317

(22) Filed: Oct. 20, 2015

(65) Prior Publication Data

US 2016/0229368 A1 Aug. 11, 2016

Related U.S. Application Data

(63) Continuation-in-part of application No. 14/722,148, filed on May 27, 2015, now Pat. No. 9,919,674, which is a continuation-in-part of application No. 14/511,223, filed on Oct. 10, 2014, now abandoned, which is a continuation-in-part of application No. 13/372,497, filed on Feb. 14, 2012, now abandoned, which is a continuation of application No. 11/627,983, filed on Jan. 28, 2007, now Pat. No. 8,128,145, which is a continuation-in-part of application No. 10/906,209, filed on Feb. 9, 2005, now Pat. No. 7,178,850.

(51) Int. Cl.
*B60R 13/02* (2006.01)
*B60R 21/216* (2011.01)

(52) U.S. Cl.
CPC ........ *B60R 13/0275* (2013.01); *B60R 21/216* (2013.01); *B60R 2013/0287* (2013.01); *B60R 2021/2163* (2013.01); *Y10T 24/33* (2015.01); *Y10T 24/3907* (2015.01); *Y10T 24/3909* (2015.01); *Y10T 29/49959* (2015.01)

(58) Field of Classification Search
CPC .......................... B60R 21/216; B60R 21/2163
See application file for complete search history.

(56) References Cited

U.S. PATENT DOCUMENTS

| | | | | |
|---|---|---|---|---|
| 5,491,892 A | * | 2/1996 | Fritz | ........................ H01R 4/64 174/51 |
| 6,045,154 A | * | 4/2000 | Walton | .................. B60R 21/215 280/728.3 |

(Continued)

*Primary Examiner* — Christopher M Koehler

(57) ABSTRACT

A tether fastening device for an automobile body structure includes a fastener clip, at least one tether strap, a tether clip bracket, a clip strap coupler, and a bracket strap coupler. The clip strap coupler operably couples to a slot in the automobile chassis. The tether clip bracket attaches to the fastener clip when in an attached position. The bracket strap coupler is attached to the body panel.

The tether strap allows for controlled detachment between the clip strap coupler and the bracket strap coupler. The strap may include a mesh to absorb the deployment energy and decelerate the body panel in a controlled manner. In the event of an airbag activation, the tether clip bracket and the fastener clip initially accelerate and then decelerate from each other. The pair of tether straps control the deceleration and separation distance of the clip strap coupler and bracket strap coupler.

25 Claims, 7 Drawing Sheets

(56) References Cited

U.S. PATENT DOCUMENTS

| | | | | |
|---|---|---|---|---|
| 6,431,585 B1* | 8/2002 | Rickabus | ............. | B60R 21/215 24/114.05 |
| 2003/0184058 A1* | 10/2003 | Gray | .................... | B60R 21/216 280/728.3 |
| 2004/0049895 A1* | 3/2004 | Draggoo | ............ | B60R 13/0206 24/297 |
| 2004/0075250 A1* | 4/2004 | Choi | .................... | B60R 21/213 280/728.3 |
| 2006/0032030 A1* | 2/2006 | Nessel | ................ | B60R 13/0206 24/289 |
| 2012/0049497 A1* | 3/2012 | Enders | ................. | B60R 21/206 280/743.1 |

\* cited by examiner

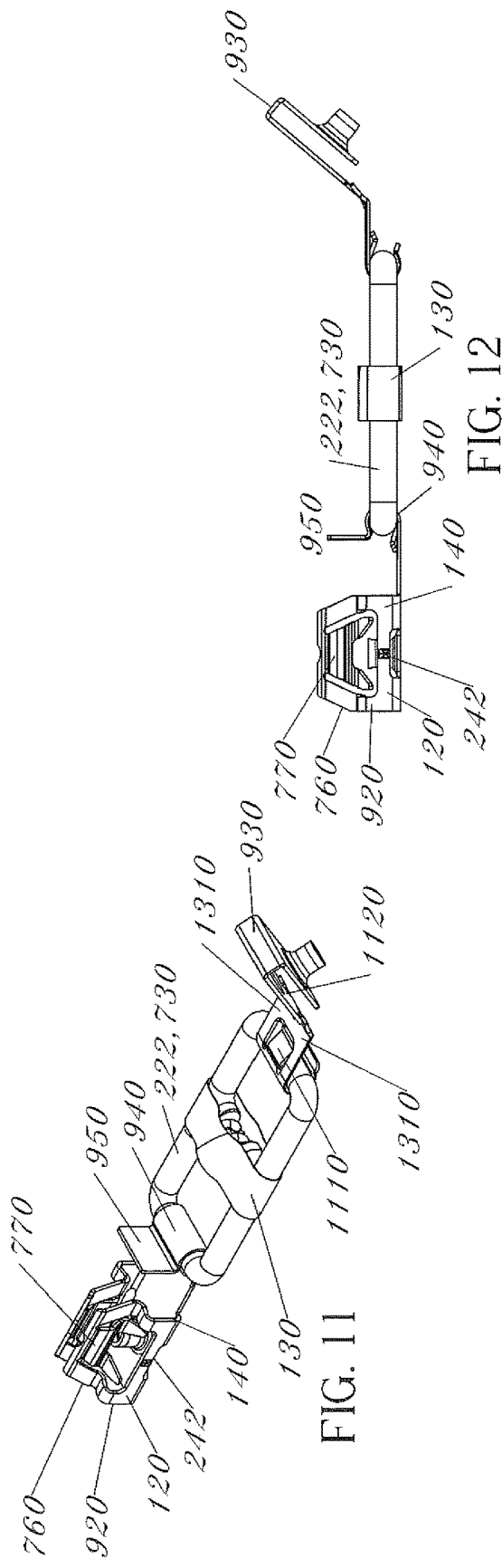
FIG. 11
FIG. 12
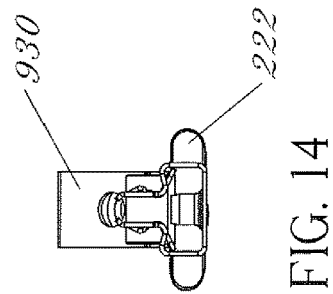
FIG. 14
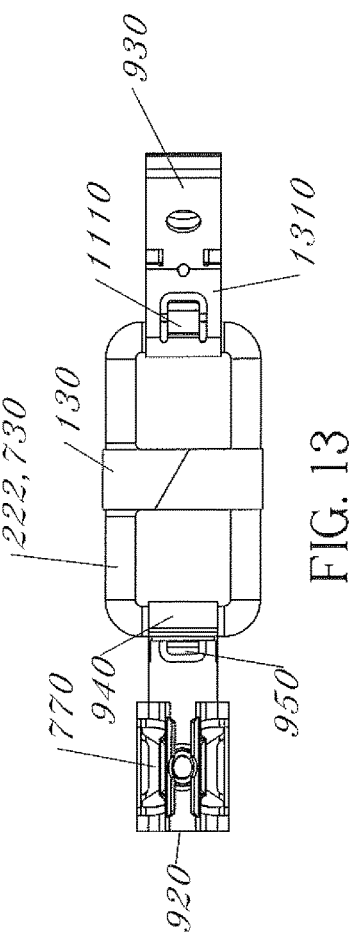
FIG. 13

TETHERED FASTENER APPARATUS AND METHOD

RELATED APPLICATIONS

This is a continuation in part application claiming priority from:

an application entitled "Tethered Fastener Apparatus and Method" having a Ser. No. 14/722,148, having a filing date of May 27, 2015, which is a continuation in part of:

an application entitled "Tethered Fastener Apparatus and Method" having a Ser. No. 14/511,223, having a filing date of Oct. 10, 2014, which is a continuation in part of:

an application entitled "Tethered Fastener Apparatus and Method" having a Ser. No. 13/372,497, having a filing date of Feb. 14, 2012, which is a continuation in part of:

U.S. Pat. No. 8,128,145 entitled "Tethered Fastener Apparatus and Method" filed on Jan. 28, 2007 which is a continuation in part of:

U.S. Pat. No. 7,178,850 entitled "Tethered Fastener Apparatus and Method" filed on Feb. 9, 2005.

The above-referenced patents and/or patent applications are hereby incorporated by reference herein in their entirety.

FIELD OF THE INVENTION

The invention relates generally to devices for fastening objects, and, more particularly, to a tethered fastener device for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior and exterior trimpieces, to the chassis of a vehicle. As used herein, a body panel refers to, for example, any body panel, a plastic interior trimpiece, a body piece, or any suitable part or an interior trimpiece made out of any suitable material, such as wood, steel, aluminum, magnesium, carbon fiber, rubber, cloth or any suitable material. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

However, with the advent of airbags placed throughout the interior of a vehicle, body panels and interior trimpieces may become ballistic and not detach necessarily in a safe, controlled manner. One problem is to safely facilitate deployment of these various airbags while minimizing the risk of body panels injuring passengers. For example, side curtain airbags or airbags that traverse down a window, seat, roof or along one chassis pillar to another chassis pillar typically travel from a storage position within the body panel along a predetermined path, in order to fully deploy the airbag and to protect occupants during a crash. Other types of airbags, such as "sausage-type" airbags and side curtain airbags, may operate in a similar fashion to protect the head as well as the chest region. As a result, these various body panels must safely disengage or detach from the vehicle chassis in a controlled manner in order to permit the airbag to, for example, deploy from within the body panel. Additionally, these body panels typically detach to permit the airbag to travel along the vehicle chassis via a rigid plastic strap or tether in a guided fashion, as is known in the art. Tether straps not integrated with the body panel fastener are known to be used to attach the body panel or interior trimpiece to the vehicle chassis in order to control the displacement of the interior trimpiece when detached.

However, when the interior trimpiece is fastened to the chassis during vehicle assembly, manual insertion of the interior trimpiece to the vehicle chassis requires attaching a separate tether strap between the interior trimpiece and the vehicle chassis in a separate step. As a result, a two-step process for attaching the body panel to the chassis is required, including the additional step of attaching the tether strap within the confines of the body panel and the vehicle chassis. These non-integrated, separate tether straps increase assembly costs, and therefore increase production costs, leading to higher vehicle prices because of the increased amount of labor involved when installing the tether straps between the interior trimpiece and the vehicle chassis. Further, the requirement for the separate installation of a tether strap between the interior trimpiece and the vehicle chassis further increases the likelihood of an inadvertent failure to properly attach the tether strap between the interior trimpiece and the vehicle chassis during assembly. If the non-integrated, separate tether strap is not properly installed, the interior trimpiece may detach in an uncontrolled manner and possibly come in contact with the vehicle passengers.

BRIEF DESCRIPTION OF THE DRAWINGS

The present invention is illustrated by way of example and not limitation in the accompanying figures, in which like reference numerals indicate similar elements, and in which:

FIGS. 11-14 are different views of a tether strap fastener according to one embodiment of the present invention;

DETAILED DESCRIPTION OF THE PREFERRED EMBODIMENTS

Figure 1:
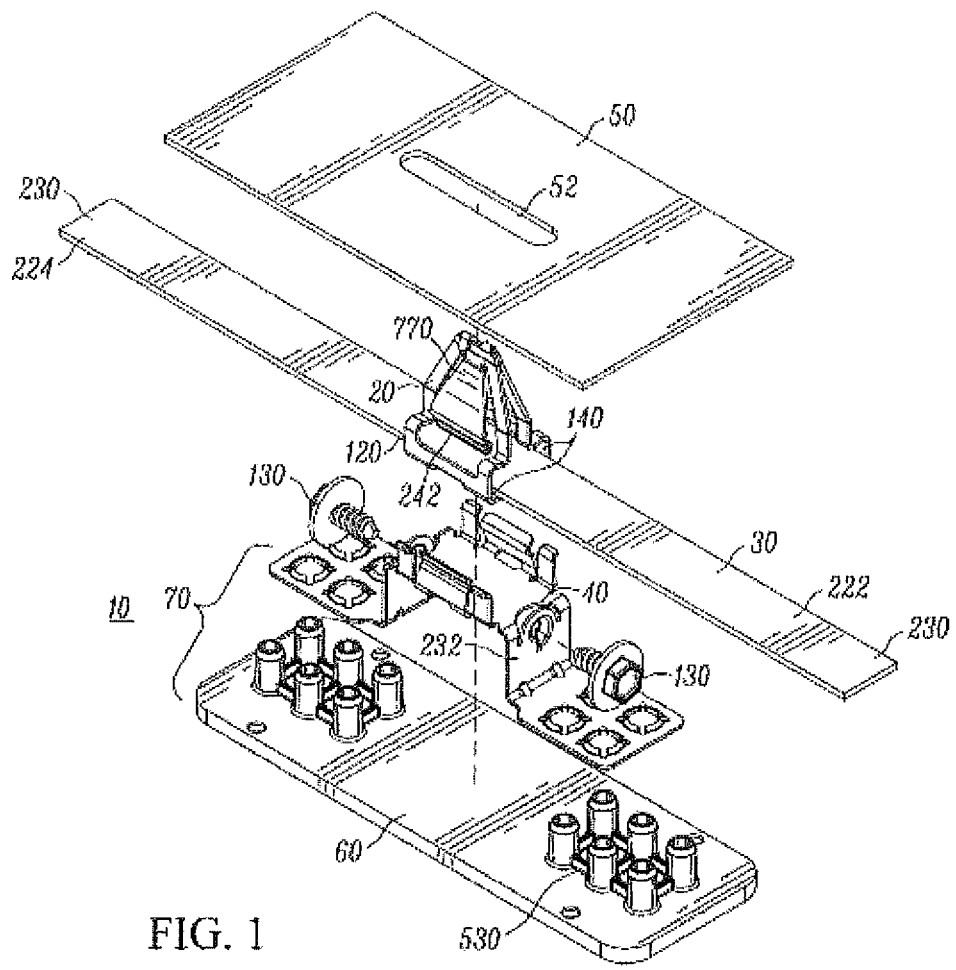
FIG. 1 is a perspective exploded view of a body panel assembly in accordance with an exemplary embodiment of the present invention.

A tether fastening device for an automobile body structure includes a fastener clip detachably coupled to the body panel and a strap having a first end and a second end coupled to the body panel. The strap is coupled to the fastener clip between the first end and second end and couples the vehicle chassis with the body panel to allow for controlled detachment. The strap may include a mesh such as a bungee cord or other suitable material sufficient to absorb the deployment energy and decelerate the body panel in a controlled manner. The body panel further includes a tether clip bracket detachably coupled to the fastener clip. The body panel further includes a body panel bracket attached to the tether clip bracket; and a body piece coupled to the body panel bracket. Yet another advantage is that the body panel, when detached, does not itself become ballistic in nature and thus pose a danger to the vehicle occupants. When attached, the fastener clip is attached to the body panel and to the vehicle chassis. When detached, the fastener clip may detach from the body panel while staying attached to the vehicle chassis; however, the strap controls the acceleration, speed and distance displaced between the fastener clip vehicle chassis and the body panel.

The tether strap allows for controlled detachment between the clip strap coupler and the bracket strap coupler. The strap may include a mesh to absorb the deployment energy and decelerate the body panel in a controlled manner. In the event of an airbag activation, the tether clip bracket and the fastener clip initially accelerate and then decelerate from each other. The pair of tether straps control the deceleration and separation distance of the clip strap coupler and bracket strap coupler.

Among other advantages, the tether strap forms a loop to couple the clip strap coupler and the bracket strap coupler. Alternatives to this strap for forming a loop, and for attaching the tether strap to the fastener clip, are by a screw, or nut and bolt. The tether fastening device easily facilitates attachment of the fastening device with the body panel and vehicle chassis, while an integrated tether strap controls detachment of the fastener clip from the body panel. The tether strap is multi-strand reinforced and thus absorbs the deployment energy and decelerates the body panel in a controlled manner to avoid breakage of the strap. Alternatively, the tether strap includes a mesh reinforcement over an elastic material to strengthen the strap such that the strap resists breakage and does not allow the body panel to travel more than a predetermined distance. Since the tether fastening device includes an integrated strap, a body panel assembly may be preassembled with the strap and fastener clip already is attached and ready for attachment to a vehicle chassis in a single step. As a result, no separate step of attaching a tether strap to the vehicle is required. Since the tether strap is integrated into the fastener clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces or eliminates the chance of an improper attachment of the tether strap between the fastener clip, the vehicle chassis and the body panel, since the tether strap is already integrated with the fastener clip via a strap loop and is already attached to the body panel. In other words, the problem of inadvertently failing to attach the separate tether strap between the vehicle chassis and the body panel is greatly reduced or even eliminated. The tether strap facilitates controlled disengagement of the body panel and the vehicle chassis in order to permit deployment of an airbag, permitting the airbag to travel along a guided path that would otherwise be obstructed by the second engagement structure. Among other advantages, the use of the tether fastening device decreases production cost and increases productivity and efficiency while further increasing reliability and safety.

FIG. 1 is an exploded view of a body panel and tether assembly 10, including a fastener clip 20 (FIGS. 1-6), 760 (FIGS. 7-8), a tether strap 30, 730 and a tether clip bracket 40. The tether clip bracket 40 may attach to a body piece 60, such as a tower or post portion of the body piece 60. The body piece 60 may be part of a plastic trimpiece, a body panel or any other suitable type of panel. According to another embodiment, a body panel 70 comprises both the tether clip bracket 40 and the body piece 60. For example, once the tether clip bracket 40 and the body piece 60 are attached via welds, rivets screws, a dog house, or other suitable fasteners, the body panel 70 attaches and detaches from fastener clip 20. The tether clip bracket 40 may be made out of plastic, carbon fiber, fiberglass, steel, aluminum, magnesium, leather, rubber, wood or any other suitable type of material. According to one embodiment, the body piece 60 may be a plastic trimpiece cover for a B pillar in a vehicle chassis and may be made of polyvinyl chloride or any other suitable type of plastic as is known in the art. The body piece 60, the fastener tether clip 20, 700 and the tether trap 30, 730 may couple or otherwise suitably attach to another engagement structure 50, such as a vehicle chassis, structural framework, body panel, wall, substrate or any other suitable object. The tether fastening device 10 attaches to the body panel 70 and to a slot 52 in an automobile chassis 50.

The tether strap 30, 222, 224, 730 is multi-strand reinforced and thus absorbs the deployment energy and decelerates the body panel 70 in a controlled manner to avoid breakage of the strap. For example, the tether strap 30, 222, 224, 730 includes a multi-stranded material such as a mesh reinforcement over an elastic material to strengthen the tether strap 30, 222, 224, 730 such that the tether strap 30, 222, 224, 730 resists breakage and does not allow the body panel to travel more than a predetermined distance. The tether strap 30, 730 and components of the tether clip 20 may also be made of polyvinyl chloride or any suitable plastic, though any other suitable material, such as carbon fiber, wire or cable, may be used. The multi-stranded material may be a nylon mesh, a rope mesh, a metal mesh, a rubber, plastic, polyester, aluminum, steel, mesh or braid, bungee cord, or any suitable stranded material. Multi-stranded materials, such as rope or steel cables can withstand large tension forces and exhibit very high failure yield points and thus effectively prevent tether strap 30, 222, 224, 730 failure. For example, if one or a few of the strands of a mesh or cable stretch or even break, the strain is evident while the remaining strands continue to prevent breakage and secure the strap 30, 222, 224, 730.

It should be understood that the implementation of other variations and modifications of the body panel and tether fastener assembly 10 (including 700) and its various aspects shown in the figures and described herein will be apparent to those having ordinary skill in the art, and that the invention is not limited by these specific embodiments described. For example, the fastener tether clip 20 and tether strap 30, 222, 224, 730 may be coupled to the tether clip bracket 40 in any suitable manner. For example, the tether strap 30, 222, 224, 730 may be coupled to the tether clip bracket 40 on a side of the tether clip bracket 40 or on any part of the tether clip bracket 40 or body panel 60, such as on an interior trim piece inner surface, or any part of the tower or post.

Figure 2:
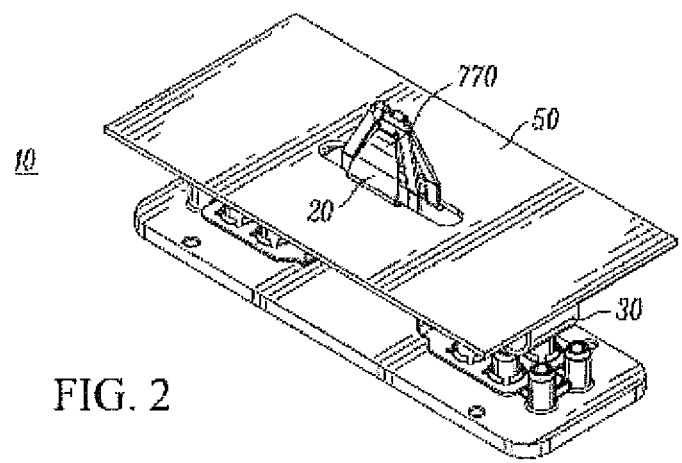
FIG. 2 is a perspective view of the body panel assembly according to one embodiment of the present invention.
Figure 3:
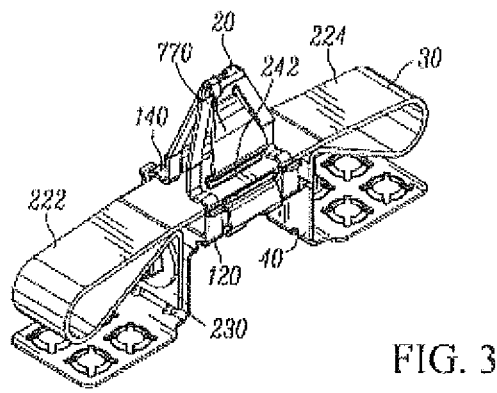
FIG. 3 is a perspective view of the body panel and fastener according to one embodiment of the invention.
Figure 4:
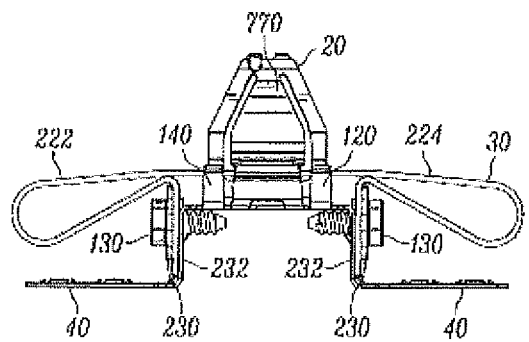
FIG. 4 is a side view of body panel assembly and fastener according to one embodiment of the invention.

FIG. 2 shows a perspective view of the body panel and tether fastener assembly 10 when attached according to one embodiment of the invention. According to one embodiment, the fastener tether clip 20, 700 is coupled to the tether strap 30, 222, 224, 730 such that the strap 30, 222, 224, 730 bends to allow the fastener 20 to clip into the tether clip bracket 40 of body panel 70 as shown in FIGS. 1-6. The tether clip bracket 40 for example, may attach to body piece 60 via fastening mechanism 530 such as a rivet, ultrasonic or heat weld, screw, pin or other suitable fastening mechanism 130, and may be preassembled. According to one embodiment, the tether strap 30, 222, 224, 730 attaches to the tether clip bracket 40 via at least two arms 222, 224 for example through fastening mechanism 130 such as a screw as shown in FIGS. 1 and 4 a single arm shown in FIG. 6, 7 or 8. Alternatively, three or flexible more arms 222, 224 are contemplated. Alternatively, the tether strap 30 attaches to the tether clip bracket 40 via ribbon cable, strap, flexible tether, weld or other flat cable. For example, the tether strap 30, 222, 224, 730 may be coupled to the tether clip bracket 40 via the base 120 of the fastener clip 20, 700 along either one side, two sides, three sides or all four sides of the base 120. As a result, the tether strap 30, 222, 224, 730 may have any suitable amount of material, including portions of varying thickness, such as an elastic material covered by a web or alternatively an externally applied object or device, such as a chain, cable or metal strap, sufficient to sustain any desired amount of detachment force.

Figure 5:
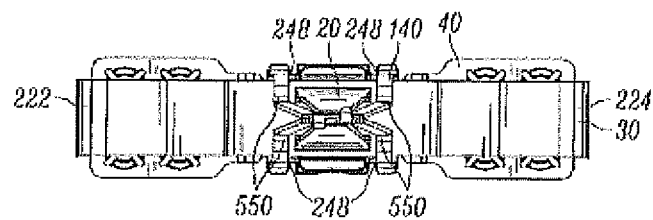
FIG. 5 depicts a top view of a tether fastening device according to another embodiment.
Figure 6:
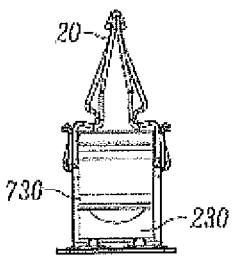
FIG. 6 depicts a side view of the tether fastening device according to another embodiment.
Figure 7:
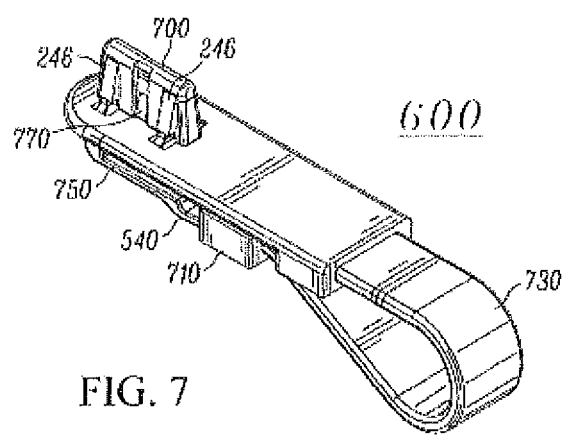
FIG. 7 depicts a tether fastening device in an engaged position according to another embodiment.
Figure 8:
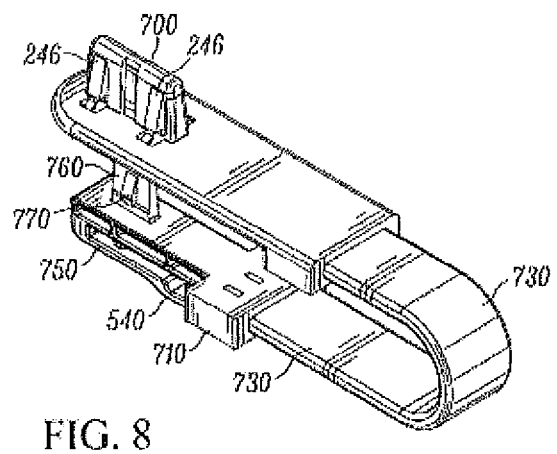
FIG. 8 depicts a tether fastener device in a disengaged position according to another embodiment.

According to one embodiment, each of the arms 30, 222, 224, 730 may attach to the base 120 via a channel 140 as shown in FIGS. 1-5 or a strap attachment 710 as shown in FIGS. 6, 7 and 8. For example, when the tether clip bracket 40 detaches from the fastener clip 20 slipped to the engagement structure 50, such as the vehicle chassis, the detachment force may be absorbed by elastic material within strap 30, 222, 224, 730 such that the web, such as a nylon sheathing acts as a strengthened portion to suitably maintain coupling between the fastener clip 20 coupled to the engagement structure 50 and the body panel 70. The strap 30, 222, 224, 730 may include a shock absorber, a tear-away portion and a weakened portion or any other suitable mechanism for absorbing all or a portion of the energy due to detachment of the engagement structure 50 from the body panel 70.

According to one embodiment, the tether clip bracket 40 of body panel 70 detaches from the fastener clip 20 on engagement structure 50 in response to the impact of a vehicle collision and related events such as air bag deployment. Therefore, the arms 30, 222, 224, 730 may include a sufficient amount of material, such as molded plastic, web reinforcement, nylon sheathing or other suitable material in order to ensure that the first engagement structure or vehicle chassis 50 and the body panel 40 remain coupled via the tether strap 30, 730.

Tether strap 30 further includes a tether strap coupler 230, 710 at one end or both ends of the tether strap 30, 730. The tether strap coupler 230, 710 is suitably coupled to a strap slot 232, 732 formed on the tether clip bracket 40, 730. According to the embodiment shown in FIG. 4, the tether strap coupler 230 and the strap slot 232 are parallel. Optionally the tether strap coupler 230, 710 and the strap slot 232, 732 are orthogonally positioned such that the tether strap coupler 230, 710 may be inserted into the strap slot 232, 732 and, when rotated, the tether strap coupler 230, 710 will resist removal from the strap slot 232, 732. Although the tether strap coupler 230 is shown as having the general outline of an end of the strap, the tether strap coupler 230, 710 may take the form or shape of any suitable attachment shape, such as a T-bar, ball, an arrow, a triangle, a square and/or a hook (as described in the parent application), for complementary engagement within the strap slot 232, 732.

The strap slot 232, 732 may be adapted to accept insertion of the tether strap coupler 230, 710 while resisting detachment of the tether strap coupler 230, 710 from the engagement structure slot 52.

FIG. 5 shows a top view of the body panel and tether fastener assembly 10 according to one embodiment of the invention. According to this embodiment, the base 120 of the fastener clip 20 includes tether retention tabs 248, 550. According to this embodiment, the tether retention tabs 248, 550 retain the fastener clip 20, by a corner or bend of the tether retention tabs 248, 550. For example, when the fastener clip 20, is engages the tether strap 30, the tether retention tabs 248, 550 spring inward while in frictional engagement with the strap 30 until the fastener clip 220 is fully inserted into and clamps strap 30. Once fully inserted, the tether retention tabs 248, 550 expand via springing action to engage the strap 30. For example, the strap 30 may engage the tether retention tab 248, 550 via the notch 242, when the fastener clip 20 is clipped into slot 52 such that the engagement structure 50 compresses the tether retention tabs 248, 550 into and thus tightly gripping the strap 30. Further, the frictional engagement and spring tension between the tether retention tab 248 and the engagement structure 50 may be sufficient to allow relatively easy insertion while increasing relative force for extracting the fastener clip 20 from the slot 50. In other words, as the engagement structure 50 is clamped between notch 242 on arm 770 and the tether retention tabs 248, 550, as the notch 242 on arm 770 springs toward and pushes the engagement structure 50 into tether retention tabs 248, 550 tightly gripping the strap 30.

According to one embodiment as shown in FIG. 8, the tether strap 710 includes a grip 750 to facilitate gripping, insertion, and turning of the strap coupler 710 and fastener 760 of tether cap 700 into engagement structure slot 52. For example, an installer may more easily grasp the grip 750 with their fingers to insert (and if necessary twist) the strap coupler 710 and fastener 760 into tether cap 700 and into engagement structure slot 52. Although the grip 750 is shown in the shape of a thickened end of the strap coupler 710, the grip 750 may be any suitable shape. The grip 750 may be an "X" (also called an X-stop), or may be formed in any shape such as an "I", "T", "V", "O" or any single or multi-sided object suitable to allow manipulation of the strap coupler 710 into engagement structure slot 52.

The body piece 60, according to one embodiment including the tether clip bracket 40, is attached to a tower or housing of a body panel which may be part of body piece 60. For example, the tether clip bracket 40, fastener clip 220, 700, 760 and body piece 60 may be preassembled for suitable assembly with the vehicle chassis 50. The entire assembly fastens via fastener clip 20, 700, 760 such as the A-, B- or C pillar or any suitable pillar of an automobile chassis 50, via slot 52. The slot 52 may be sized to allow relatively easy insertion of the fastener clip 20, 700 while resisting separation between the fastener clip 20, 700 and the vehicle chassis 50. The slot 52 may have any shape, such as a rectangle, circle, a square, a rectangle, a pentagon, a hexagon, a polygon, an n-sided polygon where n is a whole number, an ellipse, and/or an oval, or any suitable shape.

FIGS. 6-8 and 8-13 depict one example of a strap 730 such as a metal, nylon, carbon fiber, rubber mesh reinforced or plastic strap 730 attached at one end in an open loop configuration. Other embodiments are possible with legs of different shapes of arms/legs 222, 224, 730 such as different curve radius or bends, coils, angles or any suitable shape to function as a shock absorber. The fastener clip 760 includes a pair of tangs 770 to engage the tether cap 700 in a tang slot in the tether cap 700. According to one embodiment, the tang 770 includes a notch or depression suitable to increase an extraction force for the fastener clip 760 from the tether cap 700 relative to an insertion force. The tang 770 may be sized to suitably engage slot 52 of the vehicle chassis 50 in order to further increase the extraction force. According to one embodiment, a depression may be formed on tang 770. For example, the notch or depression may be formed by stamping one or more tangs 770 (FIGS. 7 and 8 and 9-13) and notch 242 (FIGS. 1, 3 and 4). The notch 242 may further include an edge, which may include an abrupt angle, a single angle, multiple angles, continuously changing angles or any suitable size angle in order to permit relatively easy insertion of the fastener clip 20, 760, and tether cap 700 into the slot 52 while increasing the extraction force. The notch 242 may be formed such that any angle may be employed, including 0°, 30°, 45°, 60°, 89°, 145°, and so on. The tether cap 700 further may include tether cap arms 246 suitable for bending when inserted into slot 52 and thus exposing tangs for engagement with slot 52.

The tether cap 700 and the fastener clip 20, 920, 760 provides an uncoupling force according to one embodiment of from at least 20 to 50 lbs. such that, during an impact, the body panel 70 suitably detaches from the vehicle chassis 50 by the tether strap 30. The fastener clip 20, 720, 920 may be any suitable fastener clip and may be any clip manufactured by Termax Corp. of Crystal Lake, Ill. According to one embodiment, the fastener clip 20, 720 may be fastener clip such as part numbers 27000, 67000, 4405, 4570, 30611, 3842, 4210, and 71500 manufactured by Termax Corp. or any suitable clip. Any component of the body panel and tether fastener assembly 10 may be, for example, molded or extruded or formed from any suitable method from plastic or any suitable material. Alternatively, any component of the body panel and tether fastener assembly 10 may be made from a strip of steel metal on a progressive die. The steps employed may include the formation of shear tabs and punches to form holes and channels as is known in the art. Additionally, rubber, plastic, paint or any suitable coating or covering may be applied in order to reduce buzzing, squeaking and rattling (BSR) during operation of the vehicle.

FIGS. 6-8 depict a tether fastening device 600 according to another embodiment. An example is provided of an open ended or non-loop strap feature previously described. Tether fastening device 600 includes tether fastener 770, strap coupler 710 and tether cap 700, grip 750 and arms 246. Although shown with a loop, the strap 730 may have a shape for example with various curvatures, bends, coils or any suitable combination to further provide shock absorption. For example, if an airbag causes a body panel 70 to detach from the chassis 50, the cap 700 remains with the chassis 50 while fastener clip 760 remains with the body piece 60. The energy caused by the sudden detachment of the body piece 60 is absorbed in part or substantially by the shock absorbers formed in the strap 730, and strap coupler 710. A hook finger 540 may be operable to releasably connect to a chassis or body panel 60 such as a B-pillar body panel or other suitable object. For example, the hook finger 540 and corresponding grooves 650 on a body molding may slide through an entry onto a corresponding coupler on body panel 60. The hook finger 540 may have a tapered hook 670 to hold and also permit easy insertion of the hook finger 540 into the body panel 60 while permitting detachment. For example, the hook finger 540 may be detached from the body panel 60 by prying the hook finger 540 and optional tapered hook to disengage.

FIG. 7 depicts the tether fastener 600 in an engaged position according to another embodiment such that the coupler 710 is engaged in the cap 700. Optional clip 760 may be inserted into cap 700 to provide a desired releasable retention force with clip 760 on coupler 710. According to this embodiment, a clip 760 is attached to the cap 700 in order to releasably engage the slot 52 of vehicle chassis 50. According to another embodiment, the clip 760 may have a base portion 544 that is flush with the coupler 710. Clip 760 further includes tang 770 for engaging slot 52 of chassis 50. According to one embodiment, clip 760 comprises opposite tangs 770 to keep both sides of clip 720 together. Tangs 770 may be finger extensions of legs that are operable to be bent to hold tangs 770 together.

FIG. 8 depicts a perspective view of the tether fastener 600 in disengaged position according to another embodiment. The tether cap 700 and arms 246 operably coupled to the vehicle chassis and the tether cap 700 is detached from the clip 760 when in a detached mode while the coupler 710 remains coupled to the body panel 60.

The releasable connections in the tether fastener 20, 760, 700 include a sequence of attachments. A first releasable coupling is formed between the optional clip 760 and the cap 700. A second releasable coupling is formed between the optional clip 760 and the coupler 710. A third releasable coupling is formed between the cap 700 and the slot 52 formed in the chassis 50. A fourth releasable coupling is formed between the hook finger 540 (FIGS. 7 and 8) or tether bracket 40 and body panel 40 (FIGS. 1-6). For example, the insertion and extraction force of each of the releasable couplings increases with the proximity of the chassis 50.

According to one embodiment, the tether strap 30, 222, 224, 730 permits the vehicle chassis 50 and the body piece 60 to separate a distance of approximately 100 mm. However, the displacement between the vehicle chassis 50 and the body piece 60 may be any distance range, including 50 to 150 mm, 25 to 175 mm and 10 to 500 mm or any suitable distance. Further, the tether cap 700 and the fastener clip 760 detach in response to a minimum uncoupling force of from 20 to 50 lbs., 10 to 100 lbs. and/or 5 to 200 lbs., or any suitable uncoupling force.

FIGS. 9-18 depict a tether fastening device 600 according to another embodiment. Another example is provided of an open ended or non-loop strap 222, 730 feature previously described.

The fastener clip 920 is coupled to the automobile chassis 50. The fastener clip 20 may optionally be further secured with screw 1540 or any suitable fastener into threaded barrel 1560. The tether clip bracket 40 is detachably coupled to the body panel 60. The fastener clip 20 further includes a tether hook 940 for attachment to the strap 222, 730.

The fastener clip 20 further includes a panel retainer 950, such as a tab formed at the end of the tether hook 940 for insertion into retaining slot 960 to further secure and stabilize fastener 920 into chassis 50. After clip 20, 920 is inserted into slot 52, even during air bag activation, clip 20, 920 remains in slot 52.

According to one embodiment, tether clip bracket 40 attaches to the tether strap 222, 730 via the tether hook 970. The tether clip bracket 40 may be in a non-orthogonal plane with respect to the fastener clip 20 when in an attached position as is typically the case after vehicle assembly. For example, if room is insufficient for both the fastener clip 920 and for the body panel 60, 70, then the strap 22, 730 may simply tether a predetermined distance. In the event of an airbag activation, the tether clip bracket 40 quickly separates from the fastener clip 20 during detachment. The looped tether strap 222, 730 control the acceleration, deceleration and separation distance of the fastener clip 920 and the body panel 60, 70. When deployed, the tether clip bracket 40 (with body piece 70) and the fastener clip 920 (attached to the chassis 50) initially accelerate and then decelerate from each other, to a safe predetermined distance.

As shown in FIGS. 9-10 and 15-17 the tether clip bracket 40 may also attach to a body piece 60 that includes a tower or post portion of a body panel 70. Threaded barrel 990 on the tether clip bracket 40 may further be secured to a threaded hole 1610 on the body piece 60 via a screw 980. The body piece 60 may be part of a plastic trimpiece, a body panel, such as a B-pillar body panel or any other suitable type of panel.

As shown in FIGS. 11 and 13, according to one embodiment, the tether clip bracket 40 further includes a hole 1110 surrounded by two arms 1310 adjacent the hole 1110 to bend and to absorb energy during deployment. According to another embodiment, the body panel 70 comprises a pre-assembled combination of both the tether clip bracket 40 and the body piece 60. For example, the Uclip 930 on tether clip bracket 40 slides into slot 530 of body piece 60 and are attached via welds, rivets screws, or other suitable fasteners. As an assembly, the body panel 70 is tethered with fastener clip 920. The fastener clip 920 and tether clip bracket 40 may be made out of metal, plastic, carbon fiber, fiberglass, steel, aluminum, magnesium, leather, rubber, wood or any other suitable type of material. According to one embodiment, the body piece 60 may be a plastic trimpiece cover for an A, B, and C-pillar in a vehicle chassis and may be made of polyvinyl chloride or any other suitable type of plastic as is known in the art. The body piece 60, via the fastening device 10 (including the fastener tether clip 920, 700 and the tether strap 30, 730, 222, 224) may couple or otherwise suitably attach to another engagement structure 50, such as a vehicle chassis, structural framework, body panel, wall, substrate or any other suitable object.

According to one embodiment, the fastener tether hook 940 and the bracket tether hook 970 are compressed or spring clamped to attach to the straps 30, 730, 222. The strap 30, 730, 222 ends may be tied or coupled for example through fastening mechanism 130 such as a clamp. The fastening mechanism 130 may be or may further include a clamp such as wire 1200, staple, wrap, "hog tie" or any suitable coupling mechanism. Optionally, fastening mechanism 130 is a cover or casing (such as tape) to cover clamp or wire 1200. Alternatively, three, four, five, six or more suitable number of flexible arms 222, 224 for each tether strap are contemplated.

The tether strap 30, 730, 222, 224 is a multi-strand reinforced strap and thus absorbs the deployment energy and decelerates the body panel 70 from the chassis 50 in a controlled manner to avoid breakage of the strap. For example, the tether strap 30, 730, 222, 224 includes a multi-stranded material such as a mesh reinforced material over an elastic material. The mesh reinforced material (mesh) strengthens the tether strap 30, 730, 222, 224 such that the elastic material on the tether strap 30, 730, 222, 224 elongates in a controlled manner, while the mesh resists breakage and does not allow the body panel 70 to travel more than a predetermined distance from the chassis 50.

The clip strap coupler 210, fastening mechanism 130, and the bracket strap coupler 710 and related components may be made of polyvinyl chloride or any suitable plastic, though any other suitable material, such as carbon fiber, wire or cable, may be used. The multi-stranded material may be a nylon mesh, a rope mesh, a metal mesh, a rubber, plastic, polyester, aluminum, steel, mesh or braid, bungee cord, or any suitable stranded material. Multi-stranded materials, such as rope or steel cables can withstand large tension forces and exhibit failure yield points of high levels and thus effectively prevent or significantly reduce tether strap 30, 730, 222, 224 failure. For example, if one or a few of the strands of a mesh or cable stretch or even break, the strain is evident while the remaining strands remain intact and continue to prevent breakage and secure the strap 30, 70, 222, 224. For example, evidence of strain of the strands or mesh may be used to determine reuse, reassembly and reinstallation of the strap 30, 730 and any component of the tether fastening device 10, 1300.

It should be understood that the implementation of other variations and modifications of the body panel and tether fastener assembly 10, 600, 900 and its various aspects shown in the figures and described herein will be apparent to those having ordinary skill in the art, and that the invention is not limited by these specific embodiments described.

The tether clip bracket 40 may further include barbs 1120 on inner portions of the U clip 930 to bite or dig into the tower 70 and to inhibit removal or sliding of U clip 930 out of slot 530 of tower 70.

Alternatively, the tether strap 30, 222, 730 may be a ribbon cable, strap, flexible tether, weld or a suitable flat cable. As a result, the tether strap 30, 222, 730 may have any suitable amount of material, including portions of varying thickness, such as an elastic material covered by a web or alternatively an externally applied object or device, such as a chain, cable or metal strap, sufficient to sustain any desired amount of detachment force.

The strap 30, 222, 730 may include a shock absorber, a tear-away portion and a weakened portion or any other suitable mechanism for absorbing all or a portion of the energy due to detachment of the engagement structure 50 from the body panel 70.

The tether clip bracket 40 of body panel 70 detaches from the fastener clip 920 on engagement structure 50 in response to the impact of a vehicle collision and related events such as air bag deployment. Therefore, the arms 224, 222, 730 may include a sufficient amount of material, such as rubber, molded plastic, web reinforcement, nylon sheathing or other suitable material in order to ensure that the first engagement structure or vehicle chassis 50 and the body panel 40 separate a predetermined distance and remain coupled via the tether strap 30, 730.

Wings 770 and wing depressions 242, on opposing sides of fastener clip 920, 700 engage slot 52 of chassis 50.

Figure 9:
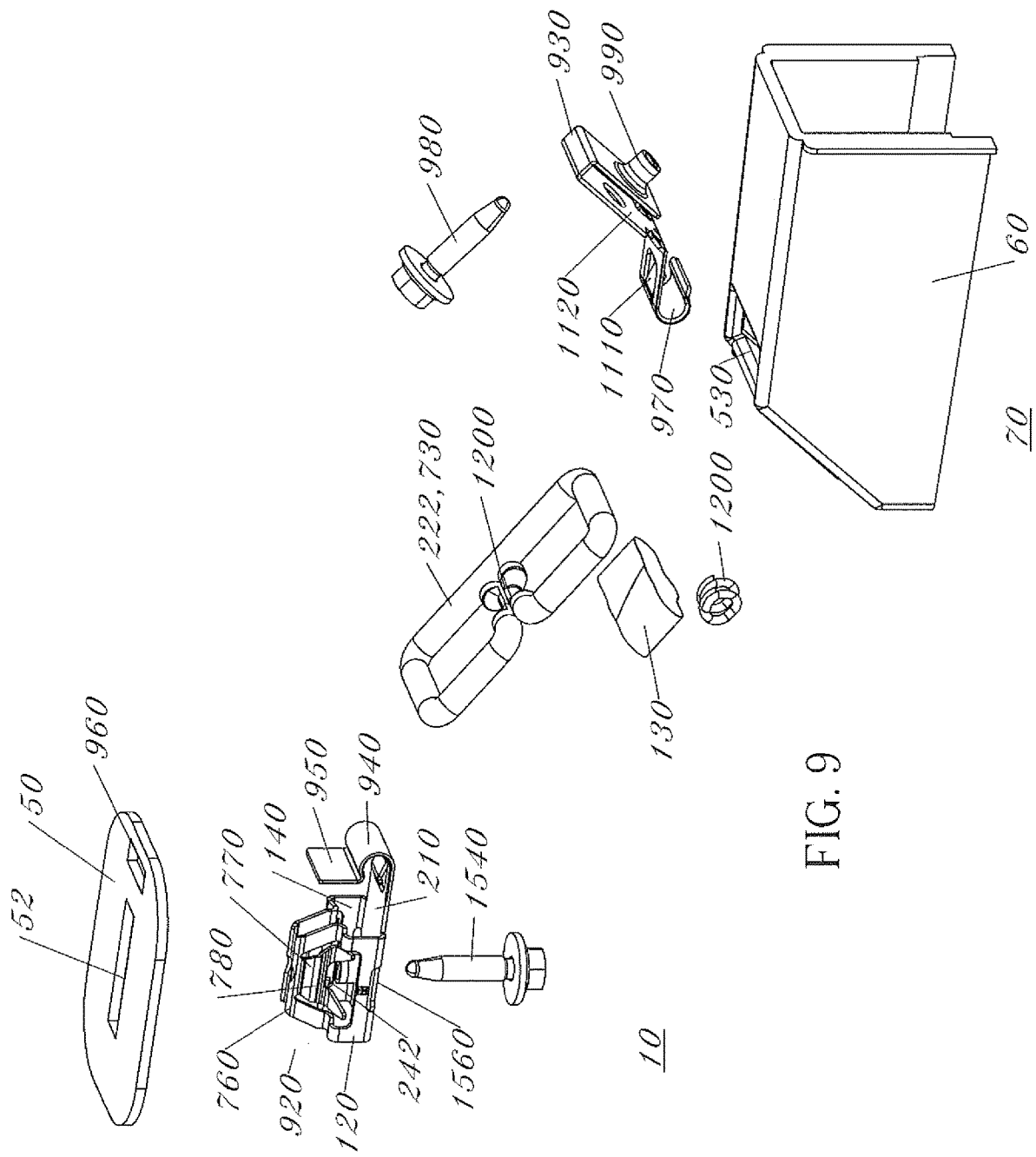
FIG. 9, is a perspective exploded view of a body panel assembly in accordance with an another embodiment of the present invention.
Figure 10:
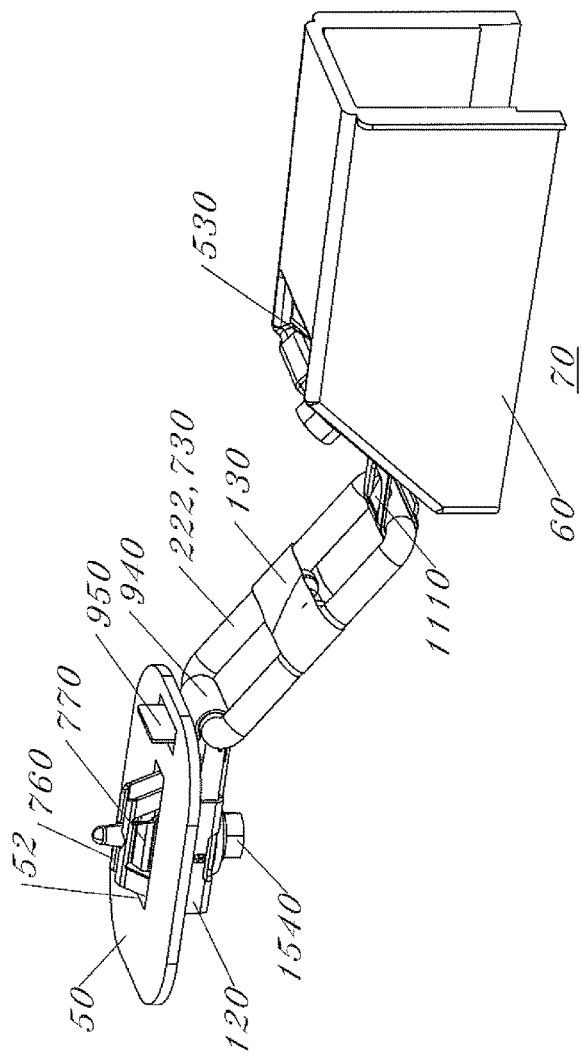
FIG. 10 are perspective view of a body panel assembly in accordance with an another embodiment of the present invention.
Figure 10:
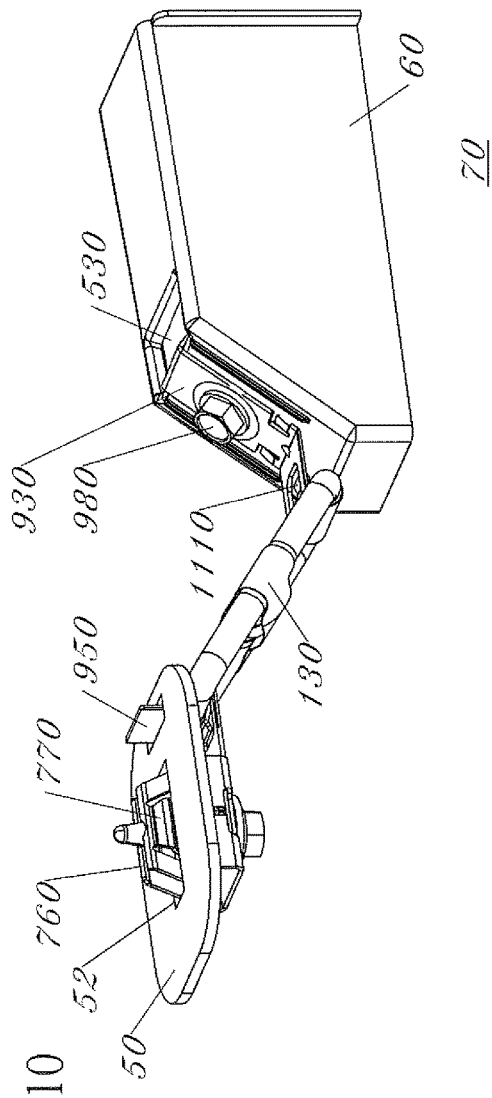
Figure 16:
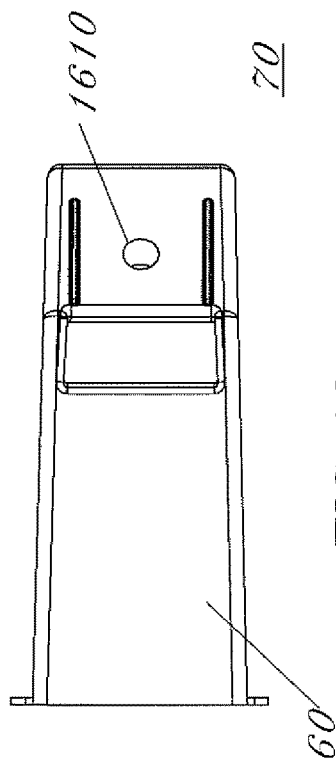
FIGS. 15-17 are different views of a tower or post portion of a body panel according to an alternative embodiment.
Figure 18:
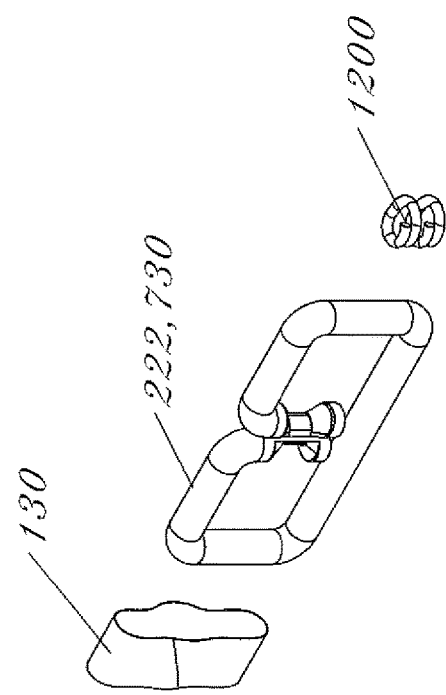
FIG. 18 is a view of a tether strap.
Figure 15:
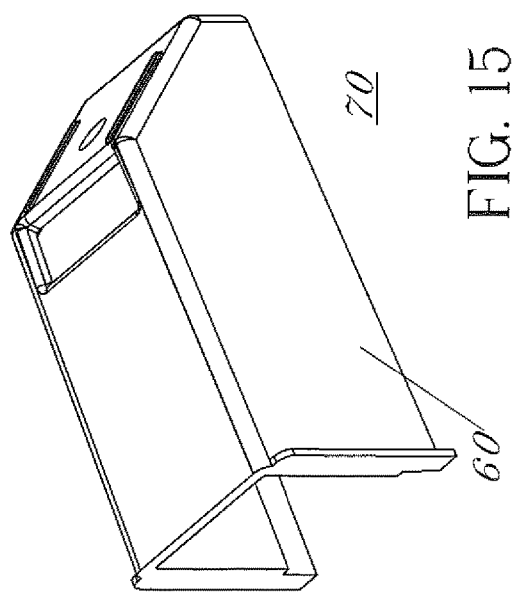
Figure 17:
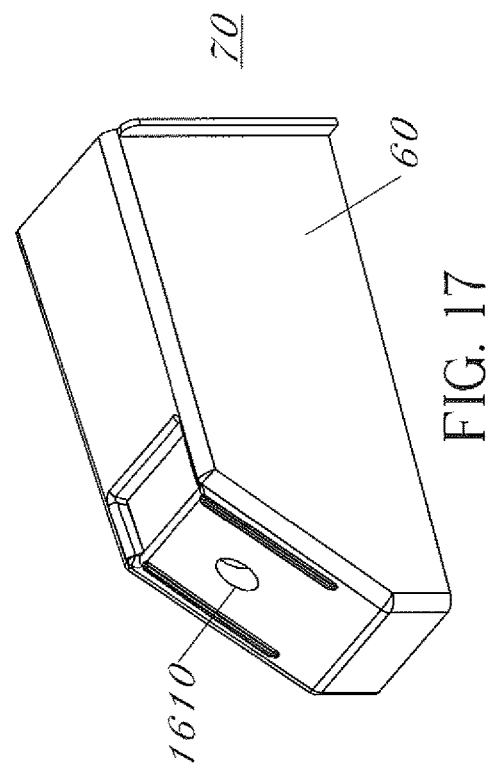

As shown in FIGS. 9 and 10, fastener clip 20, 920 has a slot 1560 on its base to engage fastener 1540 such as a pin or rivet.

The slot 52 may have any shape corresponding to wing 770, 246, such as a rectangle, circle, a square, a rectangle, a pentagon, a hexagon, a polygon, an n-sided polygon where n is a whole number, an ellipse, and/or an oval, or any suitable shape.

The fastener clip 20, 920 includes a pair of tangs 770 and fingers 780 to engage the slot 52 of the vehicle chassis 50. According to one embodiment, the tang 770 includes at least one notch or depression, or bend suitable to increase an extraction force for the fastener clip 20, 920 from the chassis slot 52 relative to an insertion force. The tang(s) 770 may be sized to suitably engage slot 52 of the vehicle chassis 50 in order to further increase the extraction force. According to one embodiment, a depression may be formed on tang 770 and/or fingers 780. For example, the notch or depression may be formed by stamping one or more tangs and notch 242 (FIGS. 1, 3 and 4).

According to one embodiment, the fastening device 10 may be assembled via the vehicle assembly method comprising the steps in any suitable order:

attaching a tether clip bracket 40 to a body panel 70;

attaching a multi-strand reinforced strap 222, 730 to a fastener clip 920;

coupling the multi-strand reinforced strap 222, 730 to a tether hook 970 of the tether clip bracket 930;

attaching a fastener clip 920 to a vehicle chassis 50; and coupling the fastener clip 920 via inserting the screw 1540.

Among other advantages, the tether strap forms a loop to couple the clip strap coupler and the bracket strap coupler. By forming a loop, other forms of attaching the tether strap to the fastener clip, such as by a screw, are not needed. The tether fastening device easily facilitates attachment of the vehicle chassis with the second engagement structure, while an integrated strap controls detachment of the vehicle chassis from the second engagement structure. The tether strap absorbs the deployment energy and decelerates the body panel in a controlled manner to avoid breakage of the strap. According to one embodiment the strap has mesh reinforcement over an elastic material to strengthen the strap such that the strap resists breakage and does not allow the body panel to travel more than a predetermined distance. Since the tether clip includes an integrated strap, a body panel assembly may be preassembled with the strap and tether clip already attached and ready for attachment to a vehicle chassis in a single step. As a result, no separate step of attaching a tether strap to the vehicle is required. Since the tether strap is integrated into the tether clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces the chance of an improper attachment of the tether strap between the vehicle chassis and the second engagement structure, since the tether strap is already integrated with the tether clip at one end and is already attached to the second engagement structure, such as a body panel. In other words, the problem of inadvertently failing to attach the separate tether strap between the vehicle chassis and the body panel is greatly reduced or even eliminated. The tether strap facilitates controlled disengagement of the body panel and the vehicle chassis in order to permit deployment of an airbag, permitting the airbag to travel along a guided path that would otherwise be obstructed by the second engagement structure. Consequently, the use of the tether fastening device decreases production costs and increases productivity and efficiency while further increasing reliability and safety. One skilled in the art would readily recognize the use of the tether fastening device in other applications such as aircraft, space craft, boating, furniture, as well as in home construction.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A tether fastening device for a body panel in an automobile comprising:
    a fastener clip having two or more arms detachably coupled to the automobile;
    a first multi-strand reinforced strap having: an end coupled to a first point on the body panel, and an opposite end coupled to an end of the fastener clip; and
    a second multi-strand reinforced strap having: an end coupled to a second point on the body panel, and an opposite end coupled to an opposite end of the fastener clip, wherein each strap absorbs a detachment force.

2. The tether fastening device of claim 1 wherein the body panel further comprises: a tether clip bracket detachably coupled to the fastener clip wherein the detachment force is applied onto each strap when the tether clip bracket detaches from the clip.

3. The tether fastening device of claim 2 wherein the body panel further comprises: a body panel bracket including the first and second points on the body panel and attached to the tether clip bracket; and a body piece coupled to the body panel bracket, wherein the detachment force on each strap tethers the fastener clip and the body panel.

4. The tether fastening device of claim 3 wherein the body panel attaches to the body panel bracket with at least one of: glue, rivets, screws, clips, pins and snaps, clamp.

5. The tether fastening device of claim 1 wherein the first multi-strand reinforced strap and the second multi-strand reinforced strap are coupled to the body panel to form a continuous strap loop.

6. The tether fastening device of claim 1 further comprising a tether clip bracket detachably coupled to the body panel wherein the tether clip bracket further includes a tether hook for attachment to the strap.

7. The tether fastening device of claim 1 wherein the fastener clip further includes a tether hook for attachment to the strap.

8. The tether fastening device of claim 1 wherein the strap includes at least one of: nylon, nylon mesh, a rope, rubber, cloth, plastic, metal, steel, aluminum, cloth covered rubber, bungee cord, a cable, a belt, a ribbon and a band.

9. The tether fastening device of claim 1 wherein the first end and second end are attached at different points on the body panel.

10. The tether fastening device of claim 1 wherein the fastener clip operably detaches from the body panel and each strap absorbs energy and resists deflection of the fastener clip from the body panel.

11. The tether fastening device of claim 1 further comprising an attached mode when the fastener clip is attached to the body panel, and a detached mode when the fastener clip is unclipped from the body panel while tethered with each strap.

12. The tether fastening device of claim 1 wherein the fastener clip is detached from the body panel while each strap prevents the body panel from traveling a maximum predetermined distance.

13. The tether fastening device of claim 1 wherein the arms further include a notch such that the arms spring inward.

14. The tether fastening device of claim 1 such that a length of the first strap is equal to a length of the second strap.

15. The tether fastening device of claim 1 further comprising:
a first strap loop coupling on a first side of the fastener clip; and
a second strap loop coupling on a second side, opposite the first side of the fastener clip.

16. The tether fastening device of claim 1 wherein each multi-strand reinforced strap further comprises a web to absorb energy having a first end and a second end coupled to the body panel, such that the strap is coupled to the fastener clip in between the first end and second end.

17. A body panel and tether assembly for an automobile body structure comprising:
a body panel;
a fastener clip having two or more arms detachably coupled to the body panel; and
a first multi-strand reinforced strap having a first end coupled to a first point on the body panel, and a second end opposite the first end coupled to an end of the fastener clip;
a second multi-strand reinforced strap having a first end coupled to a second point on the body panel, and a second end opposite the first end is coupled to an opposite end of the fastener clip, wherein:
when in an attached mode:
the fastener clip is attached to the body panel and to the automobile body structure,
when in a detached mode:
the fastener clip is unclipped from the body panel while tethered with each strap.

18. The tether fastener assembly of claim 17 wherein the body panel further comprises: a tether clip bracket detachably coupled to the fastener clip.

19. The tether fastener assembly of claim 17 wherein:
the strap includes at least one of: nylon, nylon mesh, a rope, rubber, cloth, plastic, metal, steel, aluminum, cloth covered rubber, bungee cord, a cable, a belt, a ribbon and a band.

20. A vehicle comprising:
a vehicle chassis;
a fastener clip having two or more arms clipped to the vehicle chassis and detachably coupled to a body panel; and
a first multi-strand reinforced strap having a first end coupled to a first point on the body panel, and a second end coupled to an end of the fastener clip;
a second multi-strand reinforced strap having a first end coupled to a second point on the body panel, a second end is coupled to an opposite end of the fastener clip, wherein each strap absorbs a detachment force.

21. The vehicle of claim 20 wherein the body panel further comprises:
a tether clip bracket detachably coupled to the fastener clip wherein the detachment force is applied onto each strap when the tether clip bracket detaches from the clip.

22. The vehicle of claim 21 wherein the body panel further comprises: a body panel bracket including the first and second points on the body panel and attached to the tether clip bracket; wherein the body panel is coupled to the body panel bracket.

23. The vehicle of claim 22 wherein the body panel attaches to the body panel bracket with at least one of: glue, rivets, screws, clips, pins and snaps, clamp.

24. The vehicle of claim 20 wherein the fastener clip is attached to the body panel and to the vehicle chassis when in an attached mode and the fastener clip is unclipped from the body panel while tethered with the strap when in a detached mode, such that the fastener clip remains coupled to the vehicle chassis.

25. The vehicle of claim 20 wherein the first end of the strap includes at least one of: nylon, nylon mesh, a rope, rubber, cloth, plastic, metal, steel, aluminum, cloth covered rubber, bungee cord, a cable, a belt, a ribbon and a band.

* * * * *